(12) United States Patent
Murawa

(10) Patent No.: US 11,186,120 B2
(45) Date of Patent: Nov. 30, 2021

(54) MULTI-PART, SPRUNG RAIL WHEEL

(71) Applicant: Bochumer Verein Verkehrstechnik GmbH, Bochum (DE)

(72) Inventor: Franz Murawa, Bochum (DE)

(73) Assignee: Bochumer Verein Verkehrstechnik GmbH, Bochum (DE)

( * ) Notice: Subject to any disclaimer, the term of this patent is extended or adjusted under 35 U.S.C. 154(b) by 223 days.

(21) Appl. No.: 16/329,475

(22) PCT Filed: Sep. 12, 2017

(86) PCT No.: PCT/EP2017/072826
§ 371 (c)(1),
(2) Date: Apr. 3, 2019

(87) PCT Pub. No.: WO2018/046745
PCT Pub. Date: Mar. 15, 2018

(65) Prior Publication Data
US 2019/0255880 A1   Aug. 22, 2019

(30) Foreign Application Priority Data

Sep. 12, 2016 (DE) ..................... 10 2016 117 104.2

(51) Int. Cl.
*B60B 17/00* (2006.01)
*B60B 3/02* (2006.01)
*B60B 3/04* (2006.01)

(52) U.S. Cl.
CPC ...... *B60B 17/0006* (2013.01); *B60B 17/0044* (2013.01); *B60B 3/02* (2013.01);
(Continued)

(58) Field of Classification Search
CPC .......... B60B 2310/306; B60B 17/0006; B60B 17/0044; F16B 39/101
(Continued)

(56) References Cited

U.S. PATENT DOCUMENTS

RE4,760 E * 2/1872 Woodbury ...................... 295/11
1,452,547 A * 4/1923 Call .................... B60B 17/0034
295/11
(Continued)

FOREIGN PATENT DOCUMENTS

CN   104385842 A   3/2015
DE   4230137 A1   3/1994
(Continued)

*Primary Examiner* — Kip T Kotter
(74) *Attorney, Agent, or Firm* — The Webb Law Firm

(57) ABSTRACT

The present invention relates to a multi-part rail wheel with a wheel tyre, a wheel body, an elastic body arranged between the wheel tyre and the wheel body and via which the wheel tyre is supported on the wheel body, and at least one clamping element attached to the wheel body from one end face, via which the elastic body is braced against the wheel body and the wheel tyre by clamping means acting on the wheel body, the wheel body consisting of a light metal material in the region where the clamping means act. The rail wheel guarantees secure bracing of the components with simple assembly and disassembly. This is achieved by at least one counter-bearing element being provided on the end face of the wheel body opposite the clamping element. The counter-bearing element consists of a material which has a higher strength than the wheel body material.

12 Claims, 4 Drawing Sheets

(52) U.S. Cl.
CPC ............. *B60B 3/04* (2013.01); *B60B 17/0055* (2013.01); *B60B 17/0058* (2013.01); *B60B 17/0068* (2013.01); *B60B 2310/306* (2013.01); *B60B 2360/102* (2013.01); *B60B 2360/104* (2013.01); *B60B 2360/50* (2013.01); *B60B 2900/321* (2013.01); *B60B 2900/711* (2013.01)

(58) Field of Classification Search
USPC .......................................................... 295/11
See application file for complete search history.

(56) References Cited

U.S. PATENT DOCUMENTS

| 3,127,211 | A | * | 3/1964 | Kordes | ............... B60B 17/0037 |
| | | | | | 295/11 |
| 3,135,154 | A | * | 6/1964 | Zenzic | ................. F16B 31/028 |
| | | | | | 411/12 |
| 5,183,306 | A | * | 2/1993 | Emilsson | ............ B60B 17/0044 |
| | | | | | 295/11 |
| 6,343,554 | B1 | * | 2/2002 | Affeldt | ................ B60B 17/0013 |
| | | | | | 105/136 |
| 6,375,243 | B1 | * | 4/2002 | Bradley | ................... A63G 7/00 |
| | | | | | 152/47 |
| 7,625,030 | B2 | * | 12/2009 | Bieker | ................ B60B 17/0062 |
| | | | | | 295/7 |
| 2011/0291466 | A1 | * | 12/2011 | Kanehisa | ................ B60B 1/003 |
| | | | | | 301/59 |
| 2015/0197119 | A1 | * | 7/2015 | Landaberea Rodriguez | ............... |
| | | | | | B60B 17/0044 |
| | | | | | 295/11 |

FOREIGN PATENT DOCUMENTS

| EP | 0679540 | A1 | 11/1995 |
| EP | 0733493 | B1 | 11/2001 |

\* cited by examiner

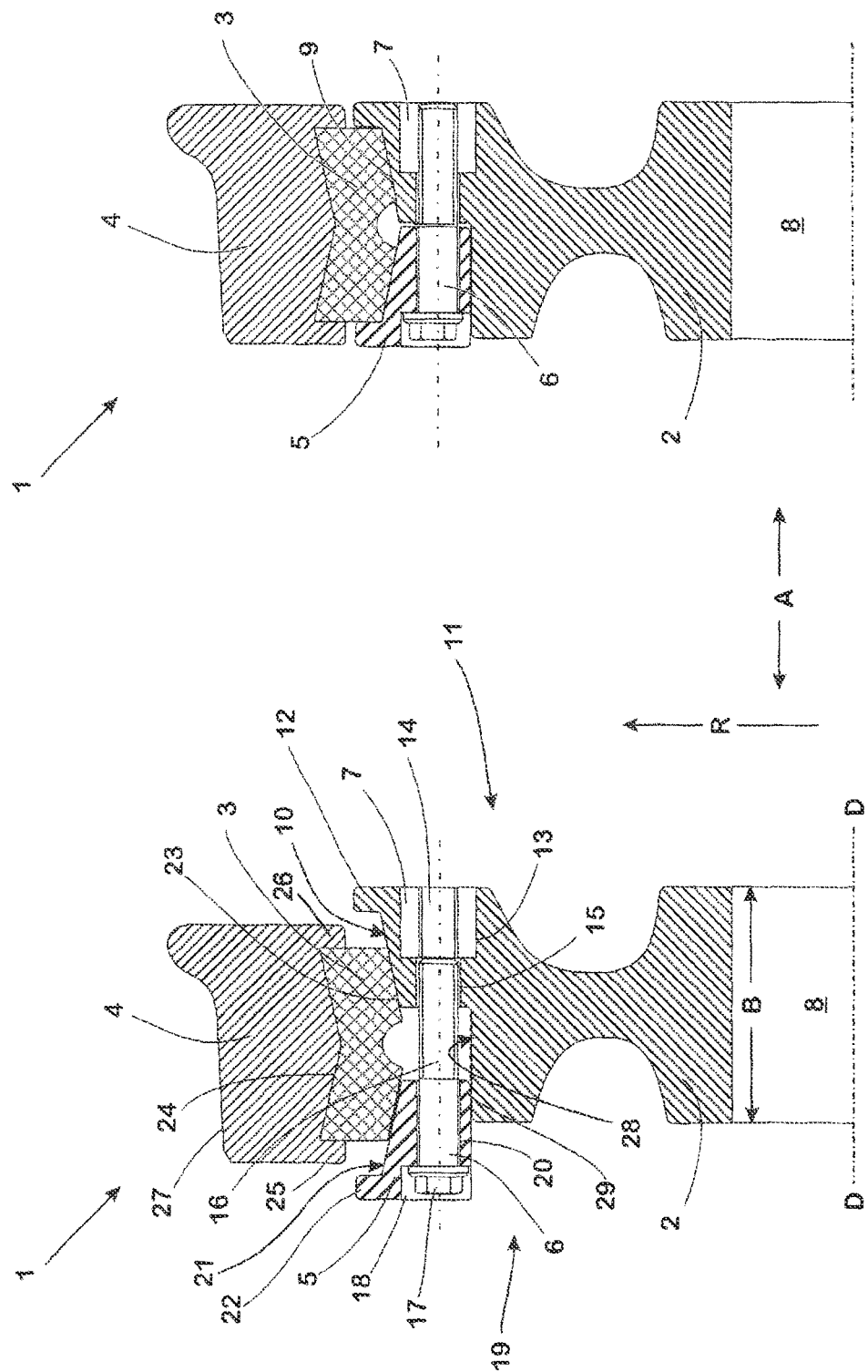

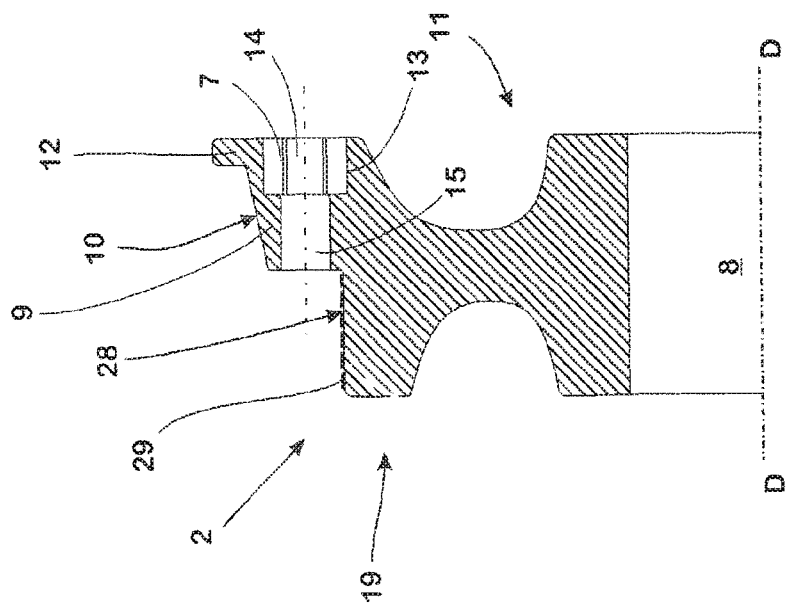
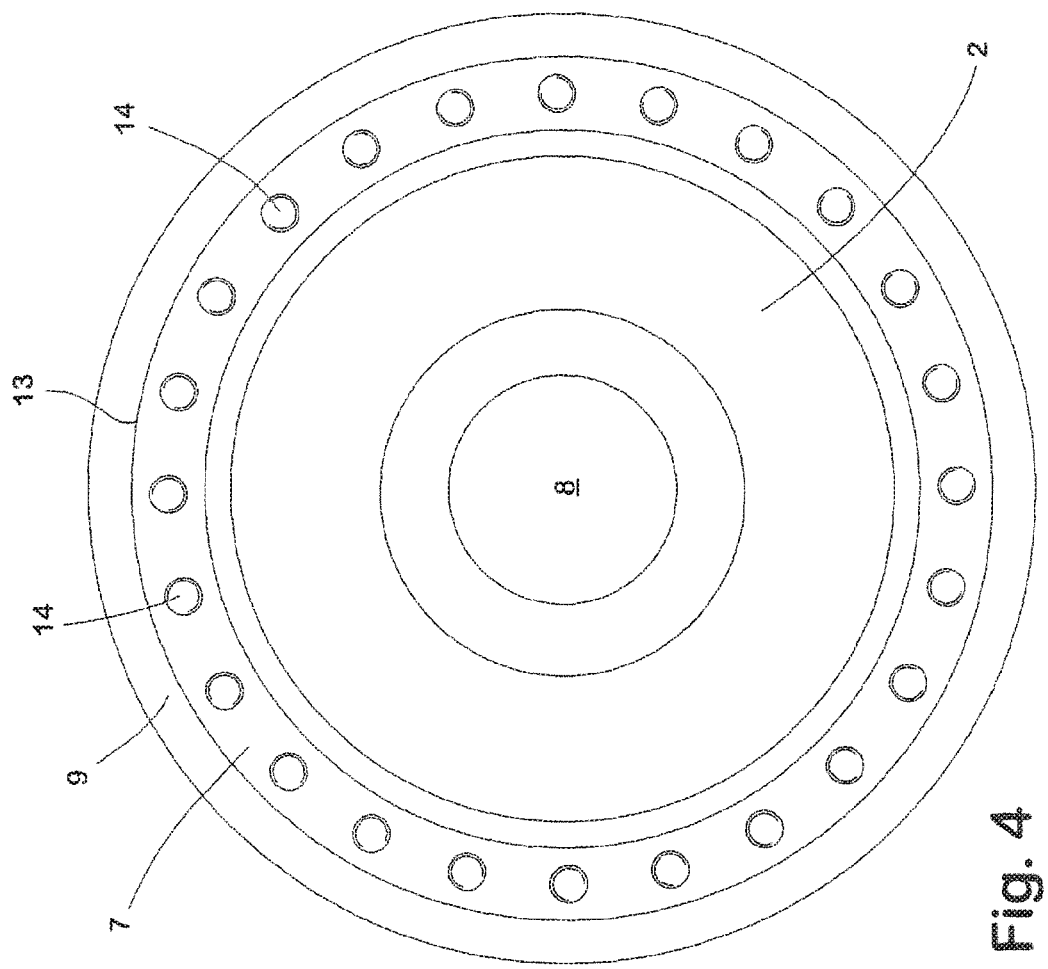

MULTI-PART, SPRUNG RAIL WHEEL

CROSS-REFERENCE TO RELATED APPLICATIONS

This application is the United States national phase of International Application No. PCT/EP2017/072826 filed Sep. 12, 2017, and claims priority to German Patent Application No. 10 2016 117 104.2 filed Sep. 12, 2016, the disclosure of each of which is hereby incorporated by reference in its entirety.

BACKGROUND OF THE INVENTION

The invention relates to a multi-part rail wheel with a wheel tyre, a wheel body and an elastic body which is arranged between the wheel tyre and the wheel body and via which the wheel tyre is supported on the wheel body, and having a clamping element which is attached to the wheel body from one end face and via which the elastic body is braced against the wheel body and the wheel tyre by means of clamping means acting on the wheel body, wherein the wheel body consists of a light metal material at least in the region against which the clamping means acts.

A rail wheel of this type is known from EP 0 733 493 B1, for example. The known rail wheel is constructed from a wheel tyre forged or rolled from steel and a wheel body made from an aluminium alloy or other light alloy material, which includes the wheel hub over which the rail wheel is mounted in use on the axle of the respective rail vehicle. There are recesses in the wheel tyre and grooves in the wheel rim for inserting rubber rings between the wheel tyre and the circumference of the wheel body. The rubber rings form an elastic body through which the wheel tyre is elastically supported on the wheel rim formed on the circumference of the wheel body. The rubber rings are clamped between the wheel body and the wheel tyre by a wedge-shaped clamping ring provided as a clamping element. For this purpose, a circumferential shoulder is formed from the one end face of the wheel body, which encircles its outer circumference and onto which the clamping ring is pushed. Fastening screws distributed over its circumference and serving as clamping means pull the clamping ring against a circumferential section of the wheel rim running around the opposite end face. The fastening screws engage with the wheel body by being guided axially parallel to the axis of rotation of the rail wheel through through openings formed in the clamping ring and screwed into threaded openings formed in the circumferential section of the wheel body.

At the beginning of the assembly of the known rail wheel, the clamping ring is located in the axial direction of the axis of rotation at a distance from the circumferential section of the wheel body. The rubber rings are located at a deep point of the V-shaped converging circumferential surfaces of the clamping ring and the circumferential section of the wheel body. If the fastening screws are then tightened, the rubber rings are increasingly widened in the radial direction and are thereby pressed against the inner circumferential surface of the wheel tyre sitting on the outer side of the rings. When the rail wheel is completely clamped, the wheel tyre is held on the wheel body with a defined elastic clamping force and at the same time elastically supported against the wheel rim. In order to facilitate the displacement of the clamping ring and to reduce signs of wear, the circumferential surface of the wheel body can be provided with a permanent coating, preferably embedded in the surfaces.

In the case of rail wheels built according to the model of the rail wheel described above, the wheel body and the clamping ring supporting the elastic body form a unit after final assembly. For the assured transmission of all forces occurring during operation, the clamping ring can additionally be fixed to the wheel body by means of a press fit.

However, practical experience shows that large forces arise when the fastening bolts are tightened. These forces result from the relative movements which occur in the course of the expansion of the elastic body via the angular surfaces of the clamping ring and the circumferential shoulder of the wheel body. In combination with the fact that the interference fit between the wheel tyre and the wheel body is also produced concurrently during the movements, these movements lead to considerable friction forces which must be overcome by the clamping forces transmitted via the fastening screws.

Here there is a risk that the light metal material of which the wheel body consists in the region of its circumferential section, into which the threads into which the fastening screws are screwed are cut, will not withstand the loads occurring during assembly or use. This danger can be countered in accordance with the principles applicable to the design of bolted connections in which a link partner is made of an aluminium material by increasing the screw-in lengths of the screws or, in many cases, by inserting additional steel thread inserts in the mounting threads inserted into the wheel body. However, one disadvantage of these measures is that the clamping length of the screws required to secure the screw connection is reduced and the required diameter increases when additional thread inserts are used. This in turn leads to a deterioration in the strength behaviour of the areas of the wheel body surrounding the receiving threads. Likewise, when screw-in tubes are used, the possibilities of screw locking are limited, particularly by adhesive bonding. At the same time, there is a danger that the screw-in tubes will also be unscrewed from the wheel body when the fastening screws are loosened.

Against the background of the prior art, the object is thus to create a multi-part, elastically spring-loaded rail wheel of the type described above, in which a secure bracing of the interacting components is guaranteed with simple assembly and disassembly using simple means.

SUMMARY OF THE INVENTION

The invention had achieved this object by the rail wheel specified in the present disclosure.

Advantageous embodiments of the invention are further disclosed in the present disclosure and are explained in detail below, as is the general inventive idea.

Accordingly, in accordance with the prior art described at the outset, a multi-part rail wheel according to the invention includes a wheel tyre, a hub, an elastic body located between the wheel tyre and the hub, by means of which the wheel tyre is supported on the hub, and at least one clamping element which is attached to the wheel body from one end face and through which the elastic body is braced against the wheel body and the wheel tyre by means of clamping means acting on the wheel body, wherein the wheel body consisting of a light metal material at least in the region against which the clamping means acts.

According to the invention, such a rail wheel now has at least one counter-bearing element, which consists of a material which has a higher strength than the light metal material of the wheel body, provided on the end face of the wheel body axially opposite the clamping element as a counter-bearing on which the clamping means provided for clamping the clamping element engage.

A rail wheel according to the invention is thus designed in such a way that a counter-bearing element prefabricated independently of the wheel body is provided on one outside of the wheel body. In this way, the counter-bearing element can be designed independently of the material of the wheel body in such a way that, on the one hand, it can safely absorb the forces occurring due to its material properties and, on the other hand, the forces it absorbs can be distributed over a large surface area over the area of the wheel body assigned to it, so that local load peaks are avoided and consequently the risk of damage to the light metal rail wheel body is safely avoided. In this way, the invention also makes it possible to design the light metal material, of which the wheel body of a rail wheel according to the invention consists, at least in the area against which the clamping of the clamping element is applied, without taking into account any forces which are directly introduced via the clamping means and which, accordingly, would also have to be absorbed directly by the material of the wheel body. Accordingly, taking into account the usual rules for the design of light metal components of the type in question here, all light metal materials proven in practice or still developed for this purpose, in particular aluminium-based materials, can be used for the wheel body.

In principle, any element that is capable of transmitting the required clamping forces and of holding the clamping element in its clamping position during finished assembly is suitable for bracing the clamping element to or on the wheel body. In this respect, all clamping elements are conceivable, which can bring about a secure hold of the clamping element on the wheel body by force or form closure. In practice, clamping screws are particularly suitable for this purpose, as they are also known from the prior art. These can be screwed into threaded holes in the counter-bearing element to brace the clamping element.

A cost-effective and at the same time practical embodiment of the invention provides that the counter-bearing element consists of a steel material with sufficient strength.

High-strength steel grades, such as the steels known as 42CrMo4 (material no. 1.7225), 34CrNiMo6 (material no. 1.6582) or 30CrNiMo8 (material no. 1.6580), are particularly suitable for this purpose.

The bolting of the wheel rim ring to a counter-bearing element consisting of a high-strength material has the particular advantage that the threaded holes formed in the counter-bearing element can have a screw-in length typical of steel. As a result, even with a comparably short thread length, large clamping forces are achieved and a good securing effect of the screw connection itself is consequently achieved.

A suitable, commonly available screw adhesive can be used to additionally secure the fastening screws used as clamping devices against automatic twisting or loosening. This makes it possible to dispense with the use of mechanically acting securing elements, such as ribs or the like attached to the clamping device, which would work into the surface of the rail wheel and lead to unpermissible damage and could cause undesirable subsidence of the connection brought about by the clamping device.

The counter-bearing element is conveniently arranged in an area adjacent to the wheel rim formed on the outer circumference of the wheel body.

The wheel body can be made of a single piece of a light metal material, in particular an aluminium material, in particular forged, in an inherently known manner.

The at least one elastic body provided for in a rail wheel according to the invention typically consists of an elastomer.

The elastic body may be in the form of a closed ring located in the gap between the wheel body and the wheel tyre of the rail wheel according to the invention. However, several elastic bodies can also be similarly provided in a manner also known, for example at evenly spaced angular distances around the axis of rotation of the rail wheel, distributed between the wheel body and the wheel tyre. The elastic body used in each case can also be constructed in two or more layers or two or more parts in order to optimally adapt its properties to the loads arising in practice.

An optimum large-area bracing of the clamping element on the rail wheel disc with simultaneous optimum mass distribution is achieved when the counter-bearing element is ring-shaped. The counter-bearing element may consist of a ring or be composed of two or more segments, which are particularly curved. The multi-piece design allows individual segments to be replaced if they are damaged during assembly or use.

In an overall ring design of the counter-bearing element, it may be appropriate for the counter-bearing element to be seated on a circumferential shoulder formed on the wheel body, rotating about the axis of rotation of the rail wheel and aligned coaxially with it. In this way, simple installation and a secure fit can be achieved at the same time. This applies in particular if the circumferential shoulder has an inner circumferential surface facing the axis of rotation against which the counter bearing rests.

As an alternative to a ring-shaped design, possibly composed of individual segments with a number of engagement points, such as threaded openings, corresponding to the number of clamping means, for the clamping means, for example the fastening screws, a number of counter-bearing elements corresponding to the provided clamping means may also be present, which are then arranged distributed around the axis of rotation of the rail wheel on the side of the wheel body facing away from the clamping element and are held there rotationally fixed.

Irrespective of the design of the respective counter-bearing element, a particularly secure fit is achieved if the respective counter-bearing element is seated in a receptacle moulded into the wheel body. This receptacle can be formed as a depression in the material of the wheel body in such a way that the counter-bearing sits at least free of clearance in the mounting.

It is advantageous if the counter-bearing is recessed flush with the face of the outer surface of the wheel body in the receptacle. If the counter-bearing element is ring-shaped, the mounting may be ring-shaped and oriented coaxially to the axis of rotation of the rail wheel. If several individual counter-bearing elements are provided, these can be arranged distributed at evenly-spaced angular distances around the axis of rotation of the rail wheel according to the arrangement of the clamping means, such as the fastening screws.

If two or more counter-bearing elements are provided, these can of course be designed in such a way that not only one clamping device but also two or more clamping devices each interact with one of these counter-bearing elements.

By pressing in, shrinkage, rolling in, clamping, gluing in, adhesive shrinkage or any other suitable method, the counter-bearing can be integrated as a load-bearing unit into the mounting of the wheel body made of lightweight construction material in order to compensate for the loss in load-bearing capacity which would otherwise occur as a result of the mounting being formed.

Even where individual counter-bearing elements are provided, these can each be located in a mounting which is formed in the section of the wheel body assigned to the counter-bearing elements.

To secure the counter-bearing or counter-bearings against twisting in the receptacle assigned to them, the respective counter-bearing and the receptacle assigned to it can be provided with a contour deviating from a circle at their circumference. For example, it may be useful to form the counter-bearing at its outer circumference and the associated receptacle at its inner circumference in the manner of a polygon course, wherein here too the counter-bearing is optimally connected to the wheel body by pressing in, shrinkage, gluing or adhesive shrinkage. The circumferential shape of the counter-bearing and the support, which deviates from the circular or cylindrical shape, primarily serves to prevent rotation of the counter-bearing during bracing of the clamping element. If fastening screws are used as clamping devices, this can alternatively or additionally be achieved by positioning the corresponding threaded openings of the counter-bearings eccentrically in relation to the longitudinal axis of the counter-bearing.

The clamping element can be designed as a clamping ring in an inherently known manner. When the rail wheel is completely mounted, this ring can form one half of the rim on which the wheel tyre is supported by the elastic body. It is naturally also possible in this connection to divide the clamping ring into two or more individual segments in order to facilitate assembly, disassembly or repair, for example. It is particularly advantageous for uniform bracing of the elastic body if the outer circumferential surface of the clamping element and the outer circumferential surface of the wheel body converge in a V-shape in a section along the axis of rotation of the rail wheel when the rail wheel is fully assembled.

In this connection, in a rail wheel according to the invention, it is also particularly advantageous if a circumferential shoulder with an outer circumferential surface is formed on the side of the wheel body facing the clamping element on which the clamping element slides when the clamping element is braced or released. To ensure an optimally secure fit, the clamping element can be pressed onto the circumferential surface. To protect the wheel body against press damage, the circumferential surface on which the clamping element slides during bracing can be coated in an inherently known manner known with a coating that reduces friction or increases or wear resistance. This coating can be applied galvanically or by thermal spraying, for example. A good electrical transition between the clamping element and the wheel body can be achieved by using molybdenum as a coating agent, which is applied, for example, by flame spraying, wherein the layer thickness existing after final finishing of the layer is 0.15 to 0.3 mm.

BRIEF DESCRIPTION OF THE DRAWINGS

The invention is explained in more detail below using a drawing representing an embodiment. Their drawings each show schematically:

FIG. 1 a rail wheel in a half-cross section in a position prepared for assembly;

FIG. 2 the rail wheel in a view corresponding to FIG. 1 in the fully assembled state;

FIG. 3 the wheel body of the rail wheel according to FIGS. 1 and 2 in a view corresponding to FIG. 1;

FIG. 4 the wheel body according to FIG. 3 in a frontal view;

DESCRIPTION OF THE INVENTION

Figure 5:
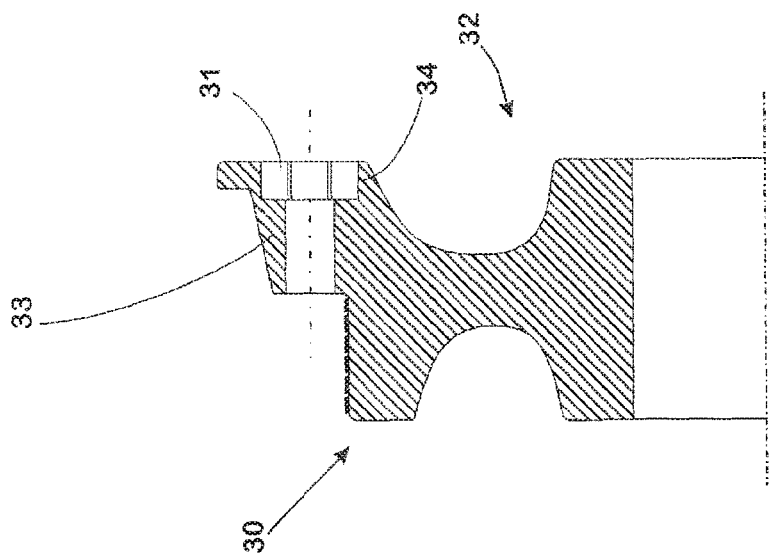
FIG. 5 an alternative embodiment of a wheel body in a view corresponding to FIG. 3.

The rail wheel 1 shown in FIGS. 1 and 2 includes a wheel body 2, an elastic body 3, a wheel tyre 4, a clamping ring 5, a plurality of fastening screws 6 serving as clamping means and a counter-bearing element 7.

The wheel body 2 is forged from a proven aluminium material in a well-known manner. It has a central hub opening 8 through which the axis of rotation D of the rail wheel 1 runs. Around the circumference of the hub 2 there is a circumferential shoulder 9 which extends over approximately half the width B of the wheel body 2 and the circumferential surface 10 of which is inclined in the direction of the centre of the width of the hub 2 in the form of a conical ring.

At its axially outer edge assigned to one end face 11 of the wheel body 2, the circumferential shoulder 9 carries a circumferential crosspiece 12. From the end face 11, a receptacle 13 is formed in the circumferential shoulder 9 around the axis of rotation D in the form of an annular groove.

The counter-bearing element 7, which is designed as a ring and consists of a high-strength steel, is pressed into the receptacle 13. The counter-bearing element 7 with its side assigned to the end face 11 is aligned flush with the free surface of the wheel body 2 on the end face 11 and has thread openings 14 distributed around the axis of rotation D at uniform angular distances. In the extension of the threaded holes 14, 9 cylindrical through-holes 15 are formed in the circumferential shoulder, which extend axially parallel to the axis of rotation D and whose diameter is larger than the diameter of the threaded holes 14.

The threaded shaft 16 is guided through the through-holes 15 by a fixing screw 6. The screw head 17 of this fixing screw 6 is supported against the bottom of a recess 18, which is formed into the clamping ring 5 from the other face 19 of the wheel body 2. The clamping ring 5, for example, also consists of an aluminium material and has a cylindrical through-hole 20 coaxially aligned with the through-hole 15, through which the threaded shaft 16 of the fixing screw 6 is also guided. The outer circumferential surface 21 of the clamping ring 5 assigned to the wheel tyre 4 is, viewed in cross section (FIGS. 1, 2), inclined at the same angle in the direction of the width centre of the wheel body 2 as the circumferential surface 10 of the circumferential shoulder 9. In cross section, the circumferential surfaces 10, 21 thus converge in a V-shape. At its edge assigned to the other end face 19, the circumferential surface 21 is bounded by a circumferential cross-piece 22 projecting radially outwards.

The elastic body 3, which is ring-shaped here, for example, sits at circumferential surfaces 10, 21. Its inner circumferential surfaces 23, which are assigned to the circumferential surfaces 10, 21, are tapered in a V-shape corresponding to the circumferential surfaces 10, 21 in cross-section. Likewise, the outer circumferential surfaces 24 of the elastic body 3, assigned to the wheel tyre 4, are V-shaped when viewed in cross-section.

In the area of the edges of the inner circumferential surfaces 23 assigned to the end faces 11 and 19, a crosspiece 25, 26 runs around again in each case. In this way the elastic body 3 between the crosspieces 25, 26 of the wheel tyre 4 is already positively held and correctly positioned in the stage prepared for mounting (FIG. 1).

The elastic body 3 consists of an elastomer material already proven for this purpose. It can be designed as a one-piece ring or composed of several individual segments. Likewise, instead of a ring-shaped elastic body 3, several block-like elastic bodies arranged spatially separated from each other at uniform angular spacings around the axis of rotation D can be arranged in the outer circumferential surfaces 10, 21, and these inner circumferential surfaces of the wheel tyre 4 also converge in a V-shape when viewed in cross-section.

The wheel tyre 4, which is designed in the usual way in the area of its tread 27, consists, for example, of a steel material which has been proven for this purpose.

On the circumferential side, the other half of the width B of the wheel body 2 not occupied by the circumferential shoulder 9 is occupied by a shoulder whose circumferential surface 28 is aligned parallel to the axis of rotation D. The clamping ring 5 with press fit is pressed onto the circumferential surface 28. In order to prevent the material from being eaten away, the circumferential surface 28 is coated with a 0.2 mm thick Mo-layer 29 in an inherently known manner.

To assemble the rail wheel 1, the elastic body 3 is placed in the wheel tyre 4 so that it sits flush between the crosspieces 25, 26 of the wheel tyre 4. Then the combination of elastic body 3 and wheel tyre 4 is pushed from the front side 19 onto the circumferential surface 10 of the circumferential section 9.

Now the clamping ring 5 is pressed onto the circumferential surface 28 until the free end of the threaded shaft 16 of the fastening screws 6 inserted into it reaches the corresponding threaded opening 14 in the counter-bearing element 7. The fastening screws 6 are subsequently tightened. The clamping ring 5 moves accordingly in axial direction A towards the circumferential section 9. The tensile forces occurring are absorbed by the counter-bearing element 7 and distributed over the circumferential shoulder 9. The tightening of the fastening screws 6 is continued until the gap between the circumferential shoulder 9 and the clamping ring 5 is nearly closed. The elastic body 3 slides on the inclined circumferential surfaces 10, 21 of the clamping ring 5 and the circumferential shoulder 9. At the same time, it is widened into radial direction R and pressed against inner circumferential surfaces 23 of wheel tyre 4.

In this way the elastic body 3 with the wheel tyre 4 it carries is in the intended position when the clamping ring 5 has reached its final position on the circumferential surface 28. The elastic body 3 is simultaneously pre-tensioned in the intended manner.

Figure 6:
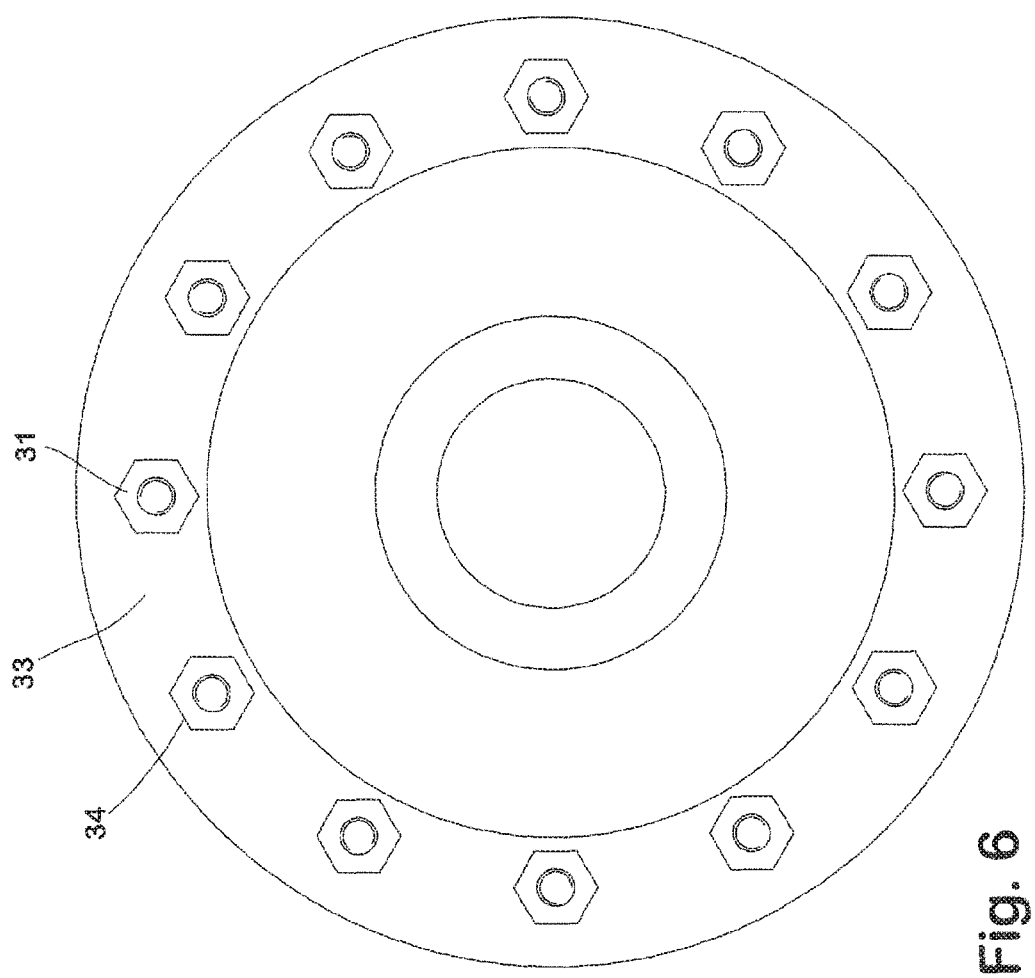
FIG. 6 the wheel body according to FIG. 5 in a frontal view.

The basic shape of the wheel body 30 shown in FIGS. 5 and 6 is the same as that of the wheel body 2. However, here each fastening screw 6 is assigned its own counter-bearing element 31 with a threaded opening and each-counter bearing element 31 is assigned its own receptacle 34 formed from the first end face 32 of the wheel body 30 in its circumferential section 33. The receptacles 34 have a hexagonal inner contour.

Accordingly, the counter-bearing elements 31 have a corresponding hexagonal shape on their outer circumference. The dimensions of the counter-bearing elements 31 are adapted to the dimensions of the receptacle 34 such that the counter-bearing elements 31 are seated with a pre-determined press fit in the respectively assigned mounting 34 and are aligned flush with the free surface of the wheel body 30 at the end face 32. The hexagonal shape of the receptacles 34 and the counter-bearing elements 31 prevents the counter-bearing elements 31 from unintentionally turning or unscrewing when the fastening screws 6 are tightened or loosened.

Figure 7:
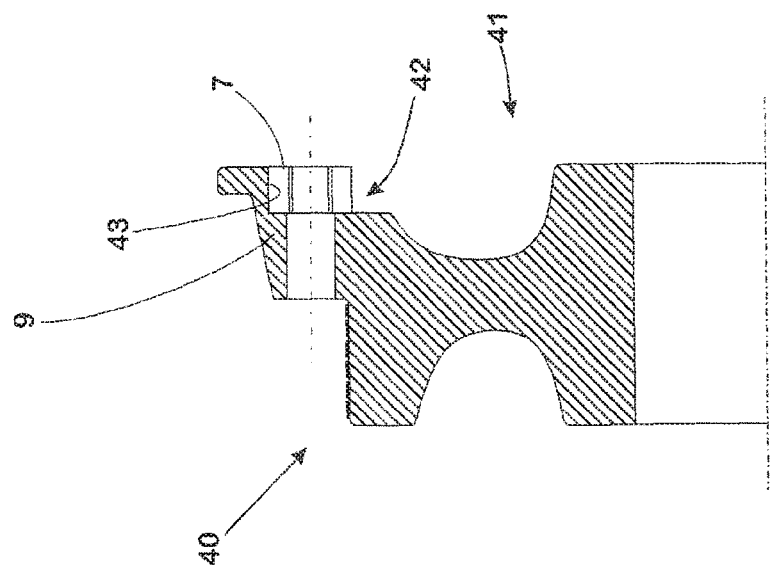
FIG. 7 an alternative embodiment of a wheel body in a view corresponding to FIG. 3.
Figure 8:
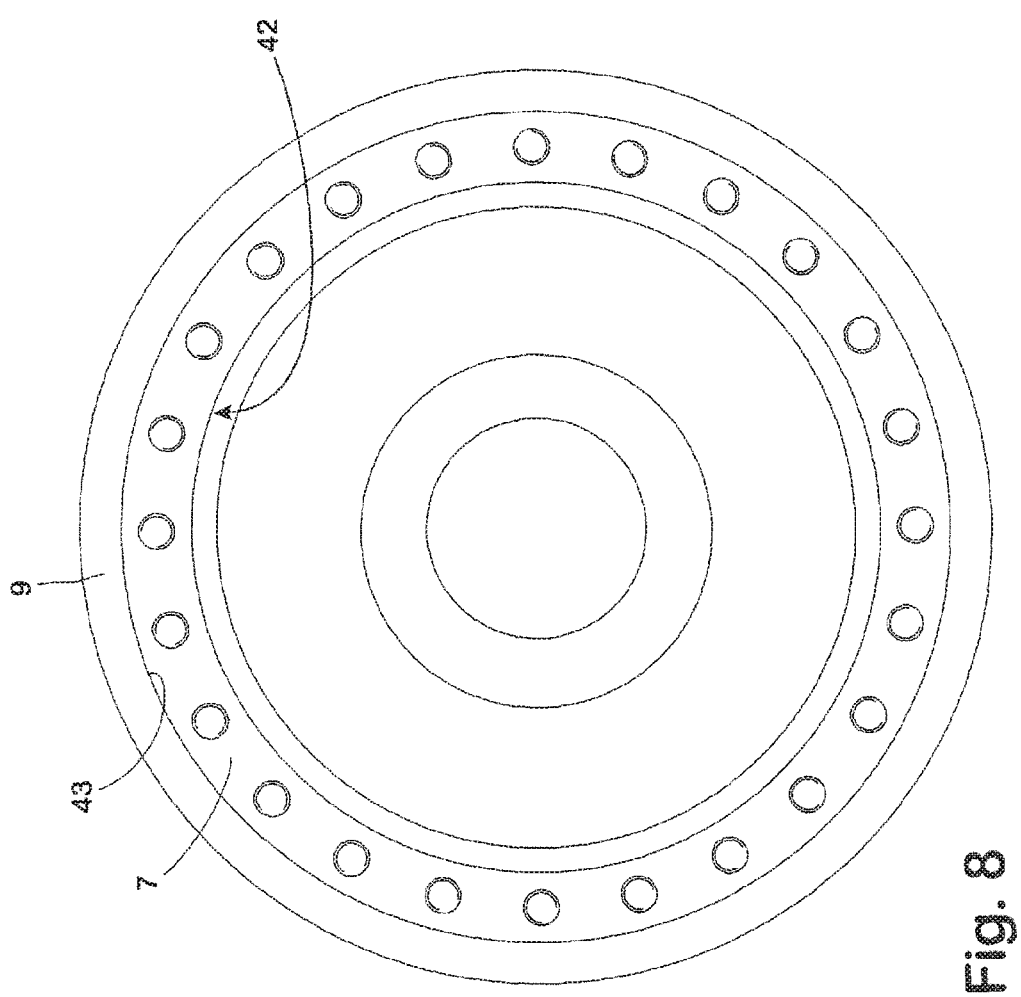
FIG. 8 the wheel body according to FIG. 5 in a frontal view.

In the design shown in FIGS. 7 and 8, the basic shape of the wheel body 40 is the same as that of the wheel body 2.

However, instead of a groove-shaped receptacle, a circumferential shoulder 42 is formed into the wheel body 2 from one end face 41. The ring-shaped counter-bearing element 7 is located on the shoulder 42. In this connection, the inner diameter of the inner circumferential surface 43 of shoulder 42 surrounding the axis of rotation D is adapted to the outer dimensions of the counter-bearing element 7 in such a way that the counter-bearing element 7 is held against shoulder 42 in the press fit acting between the outer circumferential surface of the counter bearing element 7 and the inner circumferential surface 43 of shoulder 42.

The assembly of the variants of the invention depicted in FIGS. 5-8 is carried out in the same way as that indicated above for the embodiment shown in FIGS. 1-4.

The invention claimed is:

1. A multi-part rail wheel comprising a wheel tyre, a wheel body and an elastic body arranged between the wheel tyre and the wheel body through which the wheel tyre is supported on the wheel body, and having at least one clamping element which is attached to the wheel body from one of its end faces and by which the elastic body is braced against the wheel body and the wheel tyre by clamping means which engage on the wheel body, wherein the wheel body consists of a light metal material at least in the region against which the clamping means act, wherein at the one end face of the wheel body, axially opposite the clamping element as a counter-bearing and on which the clamping means engage, at least one annular counter-bearing element is provided comprising a material which has a higher strength than the light metal material of the wheel body, and wherein the counter-bearing element is seated in a receptacle which is aligned coaxially with the axis of rotation (D) of the rail wheel and which is formed into the wheel body as a depression in the form of an annular groove.

2. The rail wheel according to claim 1, wherein the clamping means are screws which engage in threaded openings provided on the counter-bearing element.

3. The rail wheel according to claim 1, wherein the counter-bearing element comprises a high-strength steel.

4. The rail wheel according to claim 1, wherein the wheel body is manufactured in one piece from the light metal material.

5. The rail wheel according to claim 1, wherein the elastic body is an elastomer body.

6. The rail wheel according to claim 1, wherein the counter-bearing element is seated on a circumferential shoulder which is formed on the wheel body, rotates about the axis of rotation of the rail wheel, and is aligned coaxially with the rail wheel.

7. The rail wheel according to claim 6, wherein the circumferential shoulder has an inner circumferential surface which faces the axis of rotation and against which the counter-bearing element abuts.

8. The rail wheel according to claim 1, wherein the counter-bearing element is integrated into the receptacle of the wheel body by one of pressing in, shrinkage, rolling in, clamping, gluing in or adhesive shrinkage.

9. The rail wheel according to claim 1, wherein the clamping element is ring-shaped.

10. The rail wheel according to claim 1, wherein when clamped or released, the clamping element slides on a circumferential shoulder with a circumferential surface formed on the side of the wheel body facing the clamping element.

11. The rail wheel according to claim 10, wherein the circumferential surface is provided with a coating which reduces friction or increases wear resistance.

12. The rail wheel according to claim 1, wherein the outer circumferential surface of the clamping element and the outer circumferential surface of the wheel body converge in a V-shaped manner in a cut along the axis of rotation when the rail wheel is completely mounted.

* * * * *